United States Patent
Vacca et al.

(10) Patent No.: US 11,142,059 B2
(45) Date of Patent: *Oct. 12, 2021

(54) AIR GUIDE AND AIR GUIDE MODULE

(71) Applicant: Valeo Systemes Thermiques, Le Mesnil Saint Denis (FR)

(72) Inventors: Frédéric Vacca, Le Mesnil Saint Denis (FR); Jean-Louis Lanard, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 31 days.

This patent is subject to a terminal disclaimer.

(21) Appl. No.: 16/222,096

(22) Filed: Dec. 17, 2018

(65) Prior Publication Data

US 2019/0143806 A1 May 16, 2019

Related U.S. Application Data

(63) Continuation of application No. 15/307,024, filed as application No. PCT/EP2015/059294 on Apr. 29, 2015, now Pat. No. 10,155,438.

(30) Foreign Application Priority Data

Apr. 30, 2014 (FR) ...................... 1453921

(51) Int. Cl.
*B60K 11/08* (2006.01)
*B60K 11/04* (2006.01)
*B62D 25/08* (2006.01)

(52) U.S. Cl.
CPC ............ *B60K 11/085* (2013.01); *B60K 11/08* (2013.01); *B62D 25/085* (2013.01); *B60K 11/04* (2013.01); *B60Y 2306/01* (2013.01); *Y02T 10/88* (2013.01)

(58) Field of Classification Search
CPC .... B62D 22/085; B60K 11/08; B60K 11/085; B60K 13/02; F02M 13/16; F02M 13/161
See application file for complete search history.

(56) References Cited

U.S. PATENT DOCUMENTS

| | | | | |
|---|---|---|---|---|
| 5,918,663 | A * | 7/1999 | Hoglinger | B60R 19/48 165/41 |
| 8,365,854 | B2 * | 2/2013 | Lee | B60K 11/00 180/68.1 |
| 8,540,043 | B2 * | 9/2013 | Mehlos | F02M 35/161 180/69.25 |
| 8,893,835 | B2 * | 11/2014 | Nam | B60K 11/04 180/68.1 |
| 9,027,683 | B2 * | 5/2015 | Barnes | B60K 13/02 180/68.3 |
| 9,266,425 | B2 * | 2/2016 | Kawahira | F01P 11/10 |
| 9,644,525 | B2 * | 5/2017 | Bignon | F01P 7/02 |
| 10,155,438 | B2 * | 12/2018 | Vacca | B60K 11/08 |

(Continued)

*Primary Examiner* — Katy M Ebner
(74) *Attorney, Agent, or Firm* — Osha Bergman Watanabe & Burton LLP

(57) ABSTRACT

An air guide for a motor vehicle includes: at least one downstream main duct intended to be positioned in front of a heat exchange device of the motor vehicle; and at least one air inlet upstream duct configured to be connected to an air inlet, the at least one air inlet upstream duct being connected to the downstream main duct in order to guide the air from the air inlet towards the heat exchange device. The air guide is made as a single piece.

12 Claims, 3 Drawing Sheets

(56) References Cited

U.S. PATENT DOCUMENTS

Figure 1:
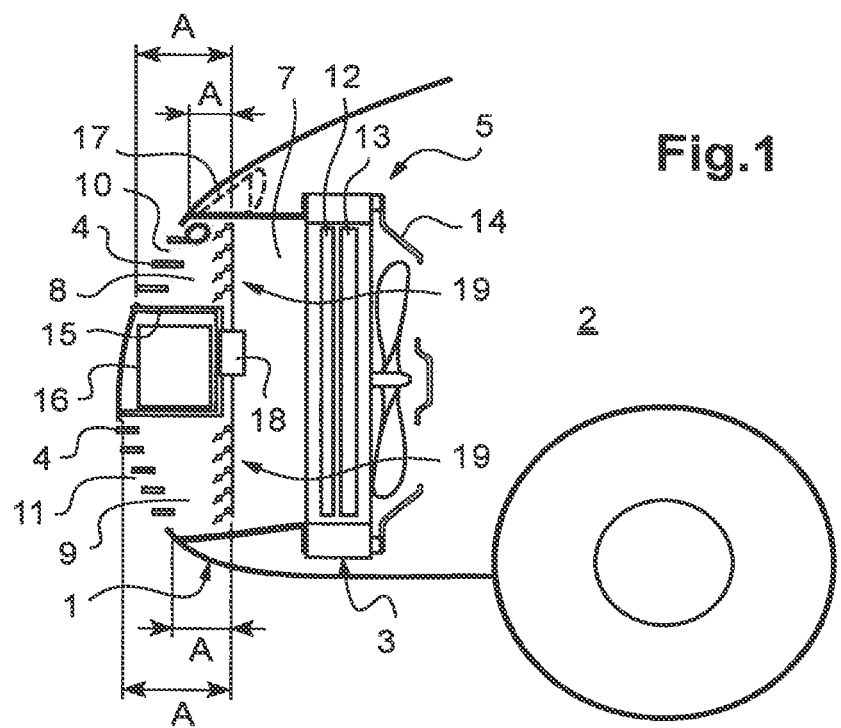

| | | | | |
|---|---|---|---|---|
| 2006/0048986 A1* | 3/2006 | Bracciano | ................ | B60H 1/28 |
| | | | | 180/69.2 |
| 2006/0102109 A1* | 5/2006 | Becker | ................... | B60K 11/08 |
| | | | | 123/41.48 |
| 2012/0193156 A1* | 8/2012 | Hirano | ................... | B60K 11/08 |
| | | | | 180/68.1 |
| 2014/0291056 A1* | 10/2014 | Takanaga | ............. | B60K 11/085 |
| | | | | 180/274 |
| 2016/0297294 A1* | 10/2016 | Bruemmer | ............. | B60K 11/04 |
| 2017/0050509 A1* | 2/2017 | Aizawa | ................ | B60K 11/085 |

\* cited by examiner

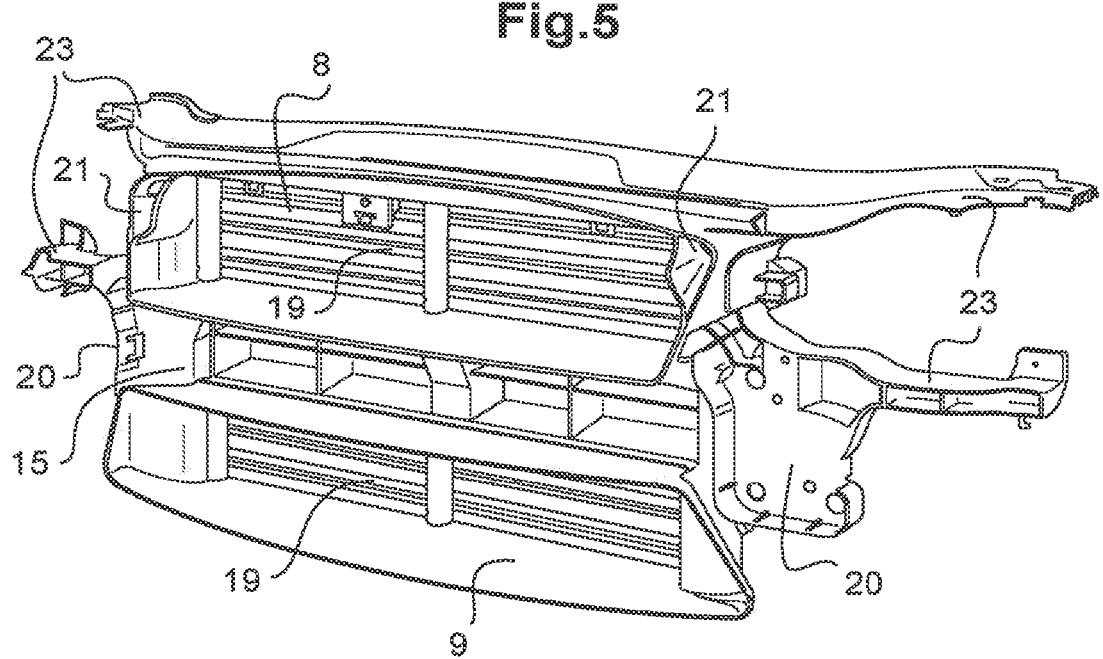

AIR GUIDE AND AIR GUIDE MODULE

The invention relates to an air guide and an air guide module.

The front surfaces of motor vehicles are generally composed of one main air inlet or of two air inlets, known as the upper channel and the lower channel, separated by a bumper beam. The heat exchangers of the motor vehicle, such as the one used for the air conditioning of the car interior, are generally positioned behind said bumper beam.

Air guide channels enabling the air to be channeled towards the heat exchangers are generally used in order to improve their thermal performance. However, the connection between the various air guide channels is not always perfectly airtight. Furthermore, the assembly and the airtightness of the assembly require a large labor input.

One of the aims of the present invention is to propose an air guide and an air guide module that are less costly to manufacture and easier to assemble.

For this purpose, the invention has as its object an air guide for a motor vehicle including at least one downstream main duct intended to be positioned in front of a heat exchange device of the motor vehicle and at least one air inlet upstream duct intended to be connected to an air inlet, the at least one air inlet upstream duct being connected to the downstream main duct in order to guide the air from the air inlet towards the heat exchange device, characterized in that the air guide is made as a single piece.

The airtightness is improved in the process, since it is no longer necessary to seal a plurality of connected components. The labor input may be reduced as a result of the reduction in the number of components to be assembled in an airtight manner, which enables the production costs to be reduced. Disassembly of the air guide is similarly facilitated.

The air guide may also have one or a plurality of the characterizing features described below, either alone or in combination.

The at least one air inlet upstream duct is made of a flexible material, for example, such that it is at least partially made of an elastomer material. The at least one air inlet upstream duct consists of an EPDM, SEBS material or a polypropylene PP material filled with EPDM, for example.

It is possible to propose that the downstream main duct is made of a more rigid material than the at least one air inlet upstream duct. The downstream main duct, for example, is made of a filled polymer material such as PP GF30 or glass-filled polypropylene. The structure of the downstream main duct is required to be reinforced, since it contributes to the overall mechanical strength of the air guide, while exhibiting a certain flexibility enabling rupture to be avoided in the event of impact and therefore the risks of damage to be reduced.

The air guide is obtained by bi-injection, for example. Bi-injection enables two different substances to be injected into the same tooling. It is thus made in a single piece, albeit composed of different materials, in particular in order to provide a more flexible material for the at least one air inlet upstream duct. According to another embodiment, the air inlet upstream ducts are molded onto the downstream main duct.

The at least one air inlet upstream duct exhibits a generally flared form towards the front, expanding on the side intended to be connected to the air inlet of said motor vehicle. The flared form of the air inlet upstream duct similarly contributes to the flexibility of the air guide.

The at least one air inlet upstream duct extends in a direction that is substantially perpendicular to a plane defined by a rear opening in the downstream main duct intended to be connected to the heat exchange device. The length for which the at least one air inlet upstream duct extends defines an absorption distance over which the air guide may deform in order to absorb impacts. The at least one air inlet upstream duct extends, for example, for an absorption distance of between 50 and 200 millimeters, for example between 80 and 120 millimeters.

Thanks to its specific form and/or as a result of the properties of the material, the at least one air inlet upstream duct exhibits a certain flexibility giving the air guide the ability to deform. Said deformation capability enables the air guide to absorb the energy released in low-speed impacts that are capable of occurring at the front of the vehicle, such as parking impacts, in particular making it possible to limit damage to the component parts of the vehicle that are situated at the rear of the air guide, such as the heat exchange device. The air guide thus ensures a supplementary function to that of the channeling of the air contributing to the absorption of impacts.

Furthermore, the at least one flexible air inlet upstream duct enables the manufacturing tolerances to be absorbed during assembly of the air guide in the motor vehicle. In fact, compensation for any clearances may be achieved without penalty by a slight deformation of the at least one air inlet upstream duct. The required tolerances are then no longer as tight as those demanded for air guide ducts that are familiar from the prior art, which are required to be assembled exhibiting a minimal clearance. The air guide is thus easier to assemble and less costly to manufacture.

According to one illustrative embodiment, the air guide includes two superimposed air inlet upstream ducts intended to be connected, on the one hand, to a respective air inlet of the motor vehicle, and, on the other hand, to the downstream main duct, in order to guide the air from the air inlet towards the heat exchange device by forming a transverse housing between the air inlet upstream ducts in order to receive a protection beam of the motor vehicle.

According to one illustrative embodiment, the air guide includes at least one supplementary air supply duct intended to be connected to an air inlet of the motor vehicle, in order to guide the air from the air inlet towards an additional device of the motor vehicle, such as a headlamp or an additional air blower. The airflow arriving from the air inlet is thus not directed solely towards the heat exchange device, but may similarly be used for cooling other devices.

According to one illustrative embodiment, the supplementary air supply duct communicates with the air inlet upstream duct upstream of a flap support of the air guide. A benefit is thus to be derived from the presence of controlled flaps, arranged between the air inlets of the vehicle and the heat exchange device and in particular enabling the rise in temperature of the exchangers to be accelerated during the heating phase, thereby reducing the fuel consumption of the vehicle, in order similarly to control the orientation of all or part of the airflow, depending on the needs, according to the inclination of the flaps, towards the one or more additional devices.

According to another illustrative embodiment, the supplementary air supply duct is separated from the air inlet upstream duct. The supplementary air supply duct thus guides one and the same flow of air towards the additional device independently of the inclination of the flaps.

The air guide includes, for example, two supplementary air supply ducts disposed to either side of an air inlet upstream duct, said supplementary air supply ducts being intended to discharge in the area of a respective headlamp of the motor vehicle. The recent technologies employed for headlamps actually require their cooling. The deviation in the flow of air from the air inlets towards the headlamps makes it possible to cool the latter without requiring the use of large heat sinks or additional air blowers.

The air guide may include at least one flap support configured so as to hold a flap panel.

The air guide may include a supporting frame, in which the downstream main duct is disposed.

The supporting frame may include an exchanger support configured so as to hold the heat exchange device of the motor vehicle. The air guide may thus support the heat exchangers and the ventilation system.

The supporting frame may comprise two headlamp supports arranged laterally to either side of the at least one downstream main duct. The air guide may thus support the headlamps.

The invention also has as its object an air guide module including an air guide as described previously and at least one flap panel mounted in the air guide. The air guide module enables the flap panel to be pre-assembled to the air guide before they are assembled in the motor vehicle, thereby facilitating their assembly.

Figure 2:
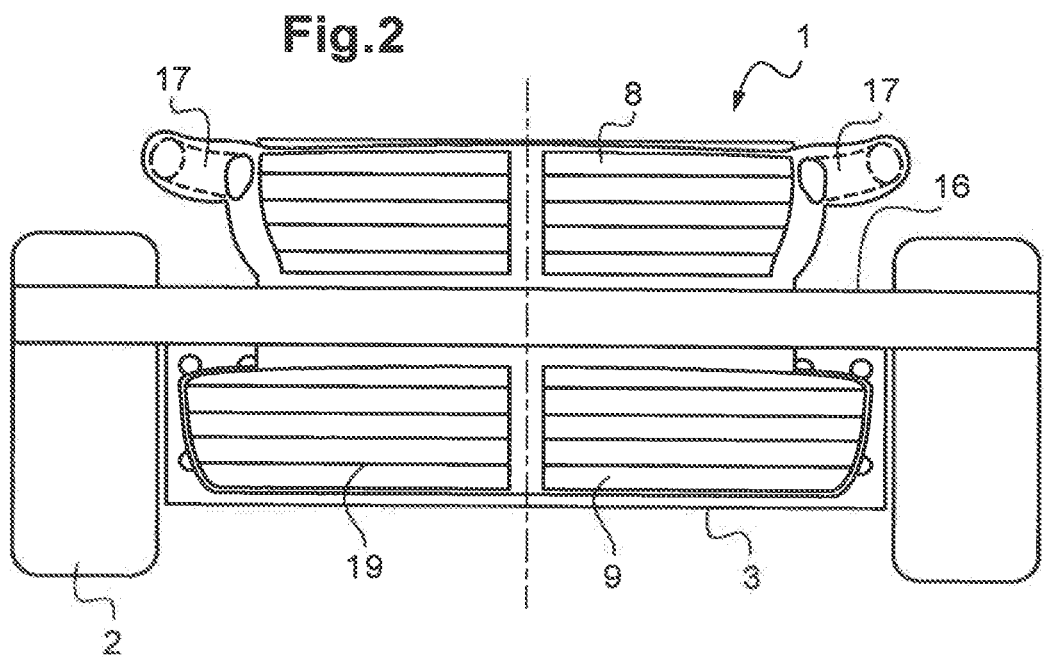
Figure 3:
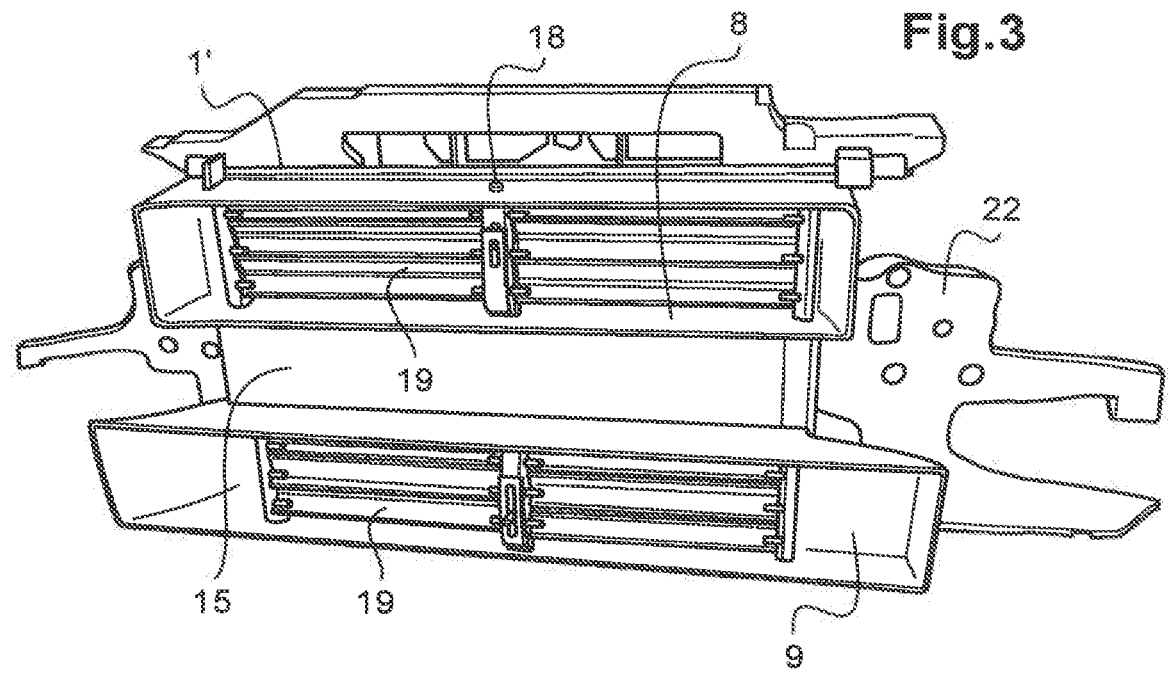
Figure 4:
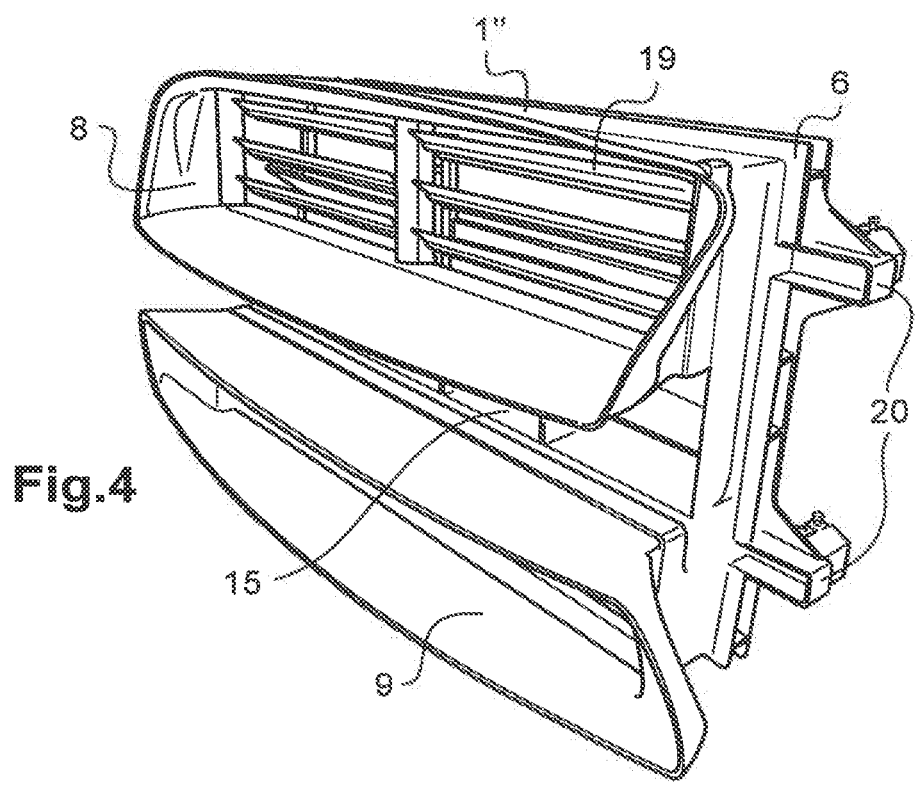

Other characterizing features and advantages of the invention will be appreciated more clearly from a perusal of the following description, which is provided by way of illustrative and non-exhaustive example, and of the accompanying drawings, in which:

FIG. 1 depicts a schematic view from the side and in vertical section of an air guide mounted in a motor vehicle, FIG. 2 depicts a schematic view from the front of the air guide depicted in FIG. 1 and of elements of the motor vehicle, FIG. 3 illustrates an illustrative embodiment of an air guide module viewed from the front, FIG. 4 shows another illustrative embodiment of an air guide module in a three-quarter front view, and FIG. 5 illustrates yet another illustrative embodiment of an air guide module.

In these figures, substantially identical elements bear the same reference designations.

FIGS. 1 and 2 illustrate a first example of the air guide 1.

The air guide 1 is mounted at the front of a motor vehicle 2, between a supporting structure 3 of the front surface of the vehicle ("carrier" or "bolster" in English), which is connected as a rule to the wings and to the longitudinal members of the vehicle, and the bumper of the vehicle, in which the radiator grille 4 is mounted. Depending on the type of vehicle, the air guide may be mounted alternatively on a structural nozzle of the front surface, the structural nozzle supporting the heat exchange device 5 of the vehicle, as depicted in FIG. 3. According to yet other illustrative embodiments, depicted in FIGS. 4 and 5 and described in detail below, the air guide itself includes a supporting frame 6 configured so as to hold the heat exchange device 5.

To return to the example in FIG. 1, the air guide 1 includes at least one downstream main duct 7 connected to the heat exchange device 5 of the motor vehicle 2, an air inlet upstream duct 8 disposed in the upper part and an air inlet upstream duct 9 disposed in the lower part.

The air inlet upstream ducts 8, 9 are connected, on the one hand, to a respective air inlet 10, 11 of the motor vehicle 2. The air inlets 10, 11, known respectively as the upper channel and the lower channel, are arranged at the front of the motor vehicle 2, behind radiator grilles 4.

The air inlet upstream ducts 8, 9 are connected, on the other hand, to a common downstream main duct 7 in order to guide the air from the air inlets 10, 11 towards the heat exchange device 5. According to another example, albeit not depicted here, the air inlet upstream ducts are connected to a respective downstream main duct, the airflows then remaining separated from the air inlets as far as the main ducts.

The heat exchange device 5 includes at least one heat exchanger facing towards a rear opening of the downstream main duct 7. The heat exchange device 5 includes, for example, a condenser 12, a radiator 13 and a ventilation system 14.

The superimposed air inlet upstream ducts 8, 9 extend in parallel in this case and are connected to the downstream main duct 7 to form a transverse housing 15, in which a protection beam 16 of the motor vehicle 2 is received.

The air guide 1 comprising the downstream main duct 7 and the air inlet upstream ducts 8, 9 is made as a single piece. The airtightness is improved in the process, since it is no longer necessary to seal a plurality of connected components. The labor input may be reduced as a result of the reduction in the number of components required to be assembled in an airtight manner, which enables the production costs to be reduced. Disassembly of the air guide is similarly facilitated.

According to one illustrative embodiment, the air guide 1 includes at least one supplementary air supply duct 17 connected to an air inlet 10 of the motor vehicle 2, in order to guide the air from the air inlet 10 towards an additional device of the motor vehicle 2, such as a headlamp or an additional air blower. The airflow arriving from the air inlet 10 is thus not directed solely towards the heat exchange device 5, but may also be used for cooling other devices.

In the illustrative embodiment depicted in FIG. 1, the supplementary air supply duct 17 communicates with the air inlet upstream duct 8 upstream of a flap panel 19.

The flaps are formed, for example, from slats that are pivotably mounted transversely on the panel 19. The inclination of the flaps may be controlled between a vertical closed position blocking the passage of the air and a plurality of intermediate positions as far as a horizontal open position where a maximum flow of air may circulate.

The controlled flaps are arranged, for example, in front of the heat exchange device 5, which, in particular, permits them to be closed in order to accelerate the increase in temperature of the exchangers during the heating phase, thereby reducing the fuel consumption of the vehicle 2.

The flap panel 19 may be mounted in the air guide 1 by means of a flap support 18 of the air guide 1.

The flap support 18 may be arranged between the downstream main duct 7 and the air inlet upstream ducts 8, 9 in order to hold a flap panel 19 in position at the rear of the air inlet upstream ducts 8, 9 (FIG. 1).

According to another illustrative embodiment, a flap panel 19 is mounted in each of the air inlet upstream ducts 8, 9, thereby improving the airtightness.

The flap panel 19 may be mounted beforehand on the air guide 1, in order to form an air guide module, which is easier to assemble in the vehicle 2.

A benefit is thus to be derived from the presence of controlled flaps, arranged between the air inlets 10, 11 of the vehicle 2 and the heat exchange device 5, in order similarly to control the orientation of all or part of the airflow, depending on the needs, according to the inclination of the flaps, towards the one or more additional devices.

As can be more clearly appreciated in FIG. 2, the air guide 1 includes, for example, two supplementary air supply ducts 17 disposed to either side of the air inlet upstream duct 8 arranged in the upper part.

The supplementary air supply ducts 17 are intended, for example, to discharge in the area of a respective headlamp (not depicted here) of the motor vehicle 2. The recent technologies employed for headlamps actually require their cooling. The deviation in the flow of air from the air inlets 10, 11 towards the headlamps makes it possible to cool the latter without requiring the use of large heat sinks or a plurality of additional air blowers.

It is further proposed that the air inlet upstream ducts 8, 9 are made of a flexible material, for example, such that they are at least partially made of an elastomer material. The air inlet upstream ducts 8, 9 consist of an EPDM, SEBS material or a polypropylene PP material filled with EPDM, for example.

The air inlet upstream ducts 8, 9 extend in a direction that is substantially perpendicular to a plane defined by a rear opening in the downstream main duct 7 connected to the heat exchange device 5, that is to say horizontally once the air guide has been mounted in the motor vehicle 2. The length for which the air inlet upstream ducts 8, 9 extend defines an absorption distance A over which the air guide 1 may deform in order to absorb impacts. The air inlet upstream ducts 8, 9 extend, for example, for an absorption distance A of between 50 and 200 millimeters, for example between 80 and 120 millimeters (FIG. 1).

Thanks to their specific forms and/or as a result of the properties of the materials, the air inlet upstream ducts 8, 9 exhibit a certain flexibility giving the air guide the ability to deform. Said deformation capability enables the air guide to absorb the energy released in low-speed impacts that are capable of occurring at the front of the vehicle 2, such as parking impacts, in particular making it possible to limit damage to the component parts of the vehicle 2 that are situated at the rear of the air guide, such as the heat exchange device 5. The air guide thus ensures a supplementary function to that of the channeling of the air contributing to the absorption of impacts.

Furthermore, the flexible air inlet upstream ducts 8, 9 enable the manufacturing tolerances to be absorbed during assembly of the air guide in the motor vehicle 2. In fact, compensation for any clearances arising at the time of attachment to the bumper may be achieved without penalty by a slight deformation of the air inlet upstream ducts 8, 9. The required tolerances are then no longer as tight as those demanded for air guide ducts that are familiar from the prior art, which are required to be assembled exhibiting a minimal clearance. The air guides are thus easier to assemble and less costly to manufacture.

Reference is now made to a second illustrative embodiment of an air guide depicted in FIG. 3.

In this illustrative embodiment, the air guide 1' lacks supplementary air supply ducts. Furthermore, it is mounted on a structural nozzle 22 of the front surface, supporting the heat exchange device 5. The flap panel 19 may be mounted in the structural nozzle 22, behind the downstream main duct 7 and the air inlet upstream ducts 8, 9.

A distinction is made in this illustrative embodiment, to the effect that the air inlet upstream ducts 8, 9 exhibit a sleeve-shaped form, that is to say an annular thin wall, of which the extremity substantially forms a lip.

The air inlet upstream ducts 8, 9 further exhibit a generally flared form towards the front, increasing on the side that is intended to be connected to the air inlets 10, 11 of the motor vehicle 2. The sleeve-shaped and flared forms of the air inlet upstream ducts 8, 9 likewise contribute to the flexibility of the air guide 1.

In a third illustrative embodiment depicted in FIG. 4, the air guide 1" includes a supporting frame 6, in which the downstream main duct 7 is disposed.

The supporting frame 6 is made of a more rigid material than the air inlet upstream ducts 8, 9. The supporting frame 6 is made of a filled polymer material such as PP GF30 or glass-filled polypropylene, for example. The structure of the supporting frame 6 is required to be reinforced, since it contributes to the overall mechanical strength of the air guide, while exhibiting a certain flexibility enabling rupture to be avoided in the event of impact and therefore the risks of damage to be reduced.

The supporting frame 6 may likewise include an exchanger support 20 comprising means of attachment interacting with the heat exchange device 5, in order to hold it. According to one illustrative embodiment, the exchanger support 20 includes perforated attachment wings arranged to either side of the downstream main duct 7 and formed in the material of the supporting frame 6. The attachment wings are intended to interact with the heat exchange device 5 in order to hold it. The air guide may thus support the heat exchange device 5.

The air guide is obtained by bi-injection, for example. It is thus made in a single piece, albeit composed of different materials, in particular in order to provide a more flexible material for the air inlet upstream ducts 8, 9 and a more rigid material for the supporting frame 6.

A fourth illustrative embodiment of an air guide module is depicted in FIG. 5.

As in the third illustrative embodiment, the air guide 1''' includes a supporting frame 6 equipped with an exchanger support 20 including perforated attachment wings, arranged to either side of the downstream main duct 7.

The supporting frame 6 further includes two headlamp supports 23 arranged laterally to either side of the at least one downstream main duct 7. The headlamp supports 23 include, for example, two support and attachment brackets, extending substantially in parallel and configured to hold and attach a respective headlamp of the motor vehicle 2. The headlamp supports 23 extend laterally, for example, above the exchanger supports 20.

The air guide further includes two supplementary air supply ducts 21 intended to be connected to the air inlet 10 of the motor vehicle 2 arranged in the upper part. The supplementary air supply ducts 21 are arranged to either side of the air inlet upstream duct 8, in order to guide the air from the air inlet 10 towards a respective headlamp.

The supplementary air supply ducts 21 are separated, for example, from the air inlet upstream duct 8. They are formed, for example, by a wall connected at its corner to the wall of the air inlet upstream duct 8. The supplementary air supply ducts 21 are thus formed in part in the air inlet upstream duct 8 and in the supporting frame 6. The supplementary air supply ducts 21 thus guide one and the same portion of the flow of air towards the headlamps independently of the inclination of the flaps.

The air guide comprising the downstream main duct 7, the air inlet upstream ducts 8, 9 and, where appropriate, the supporting frame 6, the exchanger support 20, the supplementary air supply ducts 17, 21 and the headlamp supports 23, is made in a single piece. It will be appreciated that the resulting air guides are less costly to manufacture, easier to assemble and exhibit better airtightness than the air guide channels that are familiar from the prior art.

The invention claimed is:

1. An air guide for a motor vehicle, comprising:
at least one downstream main duct disposed in front of a heat exchange device of the motor vehicle;
at least one air inlet upstream duct configured to be connected to an air inlet of the motor vehicle, the at least one air inlet upstream duct being connected to the downstream main duct in order to guide air from the air inlet towards the heat exchange device, wherein the air guide is made as a single piece;
a flap panel mounted between the at least one air inlet upstream duct and the at least one downstream main duct to control air flow between the at least one air inlet upstream duct and the at least one downstream main duct; and
at least two supplementary air supply ducts with inlets that communicate with the air inlet and that guide the air from the air inlet towards an additional device of the motor vehicle different from the heat exchange device, wherein
the at least two supplementary air supply ducts are spaced-apart from the air inlet upstream duct on the air guide.

2. The air guide as claimed in claim 1, wherein the at least one air inlet upstream duct is made of a flexible material.

3. The air guide as claimed in claim 1, wherein the downstream main duct is made of a more rigid material than the at least one air inlet upstream duct.

4. The air guide as claimed in claim 2, wherein the air guide is obtained by bi-injection.

5. The air guide as claimed in claim 1, wherein the at least one air inlet upstream duct exhibits a generally flared form towards the front.

6. The air guide as claimed in claim 1, wherein the at least one air inlet upstream duct extends in a direction that is substantially perpendicular to a plane defined by a rear opening in the downstream main duct that is connected to the heat exchange device.

7. The air guide as claimed in claim 1, further comprising two superimposed air inlet upstream ducts that are connected to a respective air inlet of the motor vehicle, and, to the downstream main duct, in order to guide the air from the air inlet towards the heat exchange device by forming a transverse housing between the air inlet upstream ducts in order to receive a protection beam of the motor vehicle.

8. The air guide as claimed in claim 1, wherein the at least two supplementary air supply ducts communicate with the at least one air inlet upstream duct, upstream of a flap support of the air guide.

9. The air guide as claimed in claim 1, wherein the at least two supplementary air supply ducts:
are disposed to either side of the at least one air inlet upstream duct, and discharge in an area of a respective headlamp of the motor vehicle.

10. The air guide as claimed in claim 1, further comprising a supporting frame, in which the at least one downstream main duct is disposed, the supporting frame comprising an exchanger support configured to hold the heat exchange device of the motor vehicle.

11. The air guide as claimed in claim 1, further comprising a supporting frame, in which the at least one downstream main duct is disposed, the supporting frame comprising two headlamp supports arranged laterally to either side of the at least one downstream main duct.

12. An air guide for a motor vehicle, comprising:
at least one downstream main duct disposed in front of a heat exchange device of the motor vehicle;
at least one air inlet upstream duct configured to be connected to an air inlet of the motor vehicle, the at least one air inlet upstream duct being connected to the at least one downstream main duct and configured to guide air from the air inlet towards the heat exchange device; and
at least two supplementary air supply ducts with an inlet connected to the at least one air inlet upstream duct, wherein:
the at least two supplementary air supply ducts are spaced-apart from the at least one air inlet upstream duct on the air guide,
the at least two supplementary air supply ducts are directly connected to the at least one air inlet upstream duct,
one of the at least two supplementary air supply ducts is disposed to a side of the at least one air inlet upstream duct and discharges in an area different from a discharging area of the at least one downstream main duct, and
the at least two supplementary air supply ducts are symmetrically arranged with respect to a center line of the motor vehicle.

* * * * *